United States Patent
Karacali-Akyamac et al.

(10) Patent No.: US 8,391,154 B2
(45) Date of Patent: Mar. 5, 2013

(54) PROBATIONARY ADMISSION CONTROL IN RELAY NETWORKS

(75) Inventors: Bengi Karacali-Akyamac, Bridgewater, NJ (US); Mark John Karol, Fair Haven, NJ (US); Parameshwaran Krishnan, North Plainfield, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 105 days.

(21) Appl. No.: 11/861,079

(22) Filed: Sep. 25, 2007

(65) Prior Publication Data

US 2008/0080523 A1 Apr. 3, 2008

Related U.S. Application Data

(60) Provisional application No. 60/827,413, filed on Sep. 28, 2006.

(51) Int. Cl.
*G01R 31/08* (2006.01)

(52) U.S. Cl. .................... 370/238; 370/395.43

(58) Field of Classification Search .................. 370/238, 370/238.1, 395.32, 395.42, 395.43
See application file for complete search history.

(56) References Cited

U.S. PATENT DOCUMENTS

| | | | |
|---|---|---|---|
| 6,515,977 B2 * | 2/2003 | Bi et al. | 370/342 |
| 6,594,235 B1 * | 7/2003 | Rochberger et al. | 370/238 |
| 6,748,433 B1 * | 6/2004 | Yaakov | 709/224 |
| 6,914,883 B2 * | 7/2005 | Dharanikota | 370/230.1 |
| 7,106,756 B1 | 9/2006 | Donovan et al. | |
| 2001/0010688 A1 | 8/2001 | Bi et al. | |
| 2003/0084182 A1 * | 5/2003 | Mahiddini et al. | 709/233 |
| 2003/0108059 A1 * | 6/2003 | Yew et al. | 370/443 |
| 2003/0161265 A1 | 8/2003 | Cao et al. | |
| 2003/0204616 A1 | 10/2003 | Billhartz et al. | |
| 2004/0042473 A1 | 3/2004 | Park et al. | |
| 2004/0100949 A1 | 5/2004 | Bennett | |
| 2005/0081082 A1 | 4/2005 | Brodie et al. | |
| 2006/0028991 A1 * | 2/2006 | Tan et al. | 370/237 |
| 2006/0089988 A1 | 4/2006 | Davie et al. | |

FOREIGN PATENT DOCUMENTS

| | | |
|---|---|---|
| EP | 1 610 496 A1 | 12/2005 |
| EP | 1 701 492 A1 | 9/2006 |
| WO | 02080462 A1 | 10/2002 |
| WO | 03094546 A1 | 11/2003 |

OTHER PUBLICATIONS

Shu Tao et al., "Improving VOIP Quality Through Path Switching", 2005, Publisher: IEEE.
Pham et al., "Performance Analysis of Reactive Shortest Path and Multi-path Routing Mechanism With Load Balance", 2003, Publisher: IEEE.
Kaur, Pamit, "U.S. Appl. No. 11/765,242 Notice of Allowance Nov. 19, 2009", , Publisher: USPTO, Published in: US.
Kaur, Pamit, "U.S. Appl. No. 11/765,242 Office Action Jul. 24, 2009", , Publisher: USPTO, Published in: US.

(Continued)

*Primary Examiner* — Mark Rinehart
*Assistant Examiner* — Matthew Hopkins

(57) ABSTRACT

A technique that seeks to direct and re-direct streams of packets through a packet network without adversely affecting the quality of service of existing streams is disclosed. In accordance with the illustrative embodiment of the present invention, streams of packets that are directed and re-directed through a packet network are initially put on probation. During the probation period, a quality-of-service measure for the stream is compared with a threshold whose value is initially high and decreases with time. This has the advantageous affect of noticing problems quickly so that they can be remediated quickly.

6 Claims, 3 Drawing Sheets

OTHER PUBLICATIONS

Ghowrwal, Omar J., "U.S. Appl. No. 11/329,933 Office Action Feb. 3, 2010", , Publisher: USPTO, Published in: US.

Varma, Suchita, "CA Application No. 2,638,941 Office Action Mar. 23, 2010", , Publisher: CIPO, Published in: CA.

Ghowrwal, Omar J., "U.S. Appl. No. 11/329,933 Office Action Mar. 31, 2011", , Publisher: USPTO, Published in: US.

Clemente Lafuente, G., "EP Application No. 08014897.6 European Search Report Dec. 6, 2010", , Publisher: EPO, Published in: EP.

Kreppel, J., "EP Application No. 06 25 5016.5-2416 Office Action May 10, 2007", , Publisher: EPO, Published in: EP.

Kreppel, Jan, "EP Application No. 06255016.5 European Search Report Dec. 21, 2006", , Publisher: EPO, Published in: EP.

Ghowrwal, Omar J., "U.S. Appl. No. 11/329,933 Office Action Nov. 12, 2010", , Publisher: USPTO, Published in: US.

Ghowrwal, Omar J., "U.S. Appl. No. 11/329,933 Office Action Jun. 18, 2009", Publisher: USPTO, Published in: US.

Bayaa, Hassan, "CA Application No. 2,603,796 Office Action Nov. 3, 2009", , Publisher: CIPO, Published in: CA.

Varma, Suchita, "CA Application No. 2,638,941 Office Action Dec. 13, 2010", , Publisher: CIPO, Published in: CA.

Shu Tao et al: "Improving VoIP quality through path switching"; Infocom 2005. 24th Annual Joint Conference of the IEEE Computer and Communication Societies. Proceedings IEEE Miami, FL, USA Mar. 13-17, 2005, pp. 2268-2278, XP010829264; ISBN: 0-7803-8968-9.

Shu Tao et al: "Exploring the performance benefits of end-to-end path switching"; Network Protocols, 2004. ICNP 2004. Proceedings of the 12th IEEE International Conference on Berlin, German Oct. 5-8, 2004, pp. 304-315, XP010734832; ISBN: 0-7695-2161-4.

Extended European Search and Written Opinion, Search report Mar. 7, 2008 written opinion Jan. 30, 2008.

\* cited by examiner

… … …

PROBATIONARY ADMISSION CONTROL IN RELAY NETWORKS

CROSS REFERENCE TO RELATED APPLICATIONS

This application claims the benefit of U.S. Provisional Application 60/827,413, filed Sep. 28, 2006, entitled "Path Switching and Call Protection for Reliable IP Telephony", which application is also incorporated by reference.

U.S. patent application Ser. No. 11/201,892, filed Aug. 11, 2005, entitled "Quality-of-Service Assurance for IP Telephony" is incorporated by reference.

U.S. patent application Ser. No. 11/765,242, filed Jun. 19, 2007, entitled "Evaluating Feasible Transmission Paths in a Packet Network" is incorporated by reference.

FIELD OF THE INVENTION

The present invention relates to telecommunications in general, and, more particularly, to the administration of packet networks.

BACKGROUND OF THE INVENTION

The advantages of using relay nodes in packets networks to provide quality-of-service assurance in networks that do not provide quality-of-service guarantees are becoming clear, as is taught in U.S. patent application Ser. No. 11/201,892, filed Aug. 11, 2005, entitled "Quality-of-Service Assurance for IP Telephony". However, the prior art is not always sufficient, and, therefore, the need exists for inventions that help ensure satisfactory quality-of-service in networks that do not provide quality-of-service guarantees.

SUMMARY OF THE INVENTION

The present invention is a technique that seeks to direct and re-direct streams of packets through a packet network without adversely affecting the quality of service of existing streams. In accordance with the illustrative embodiment of the present invention, streams of packets that are directed and re-directed through a packet network are initially put on probation. During the probation period, a quality-of-service measure for the stream is compared with a threshold whose value is initially high and decreases with time. This has the advantageous effect of noticing problems quickly so that they can be remediated quickly. Embodiments of the present invention are useful in both relay and non-relay networks.

The illustrative embodiment comprises (1) at moment $t_1$, directing a stream of packets from a source node to a destination node on a first path; (2) at moment $t_2$, calculating that a quality-of-service score $R(t)$ for the stream of packets is below a quality-of-service threshold $T(t)$ for the stream of packets; and (3) at moment $t_3$, re-directing the stream of packets from the source node to the destination node on a second path because the quality-of-service score $R(t)$ for the stream of packets on the first path is below the quality-of-service threshold $T(t)$; wherein the quality-of-service threshold $T(t)$ varies and is greater at moment $t_2$ than at moment $t_2+\Delta$; wherein moment $t_1$ is before moment $t_2$; wherein moment $t_2$ is before moment $t_3$; and wherein $\Delta$ is a positive real number greater than zero.

DETAILED DESCRIPTION

Figure 1:
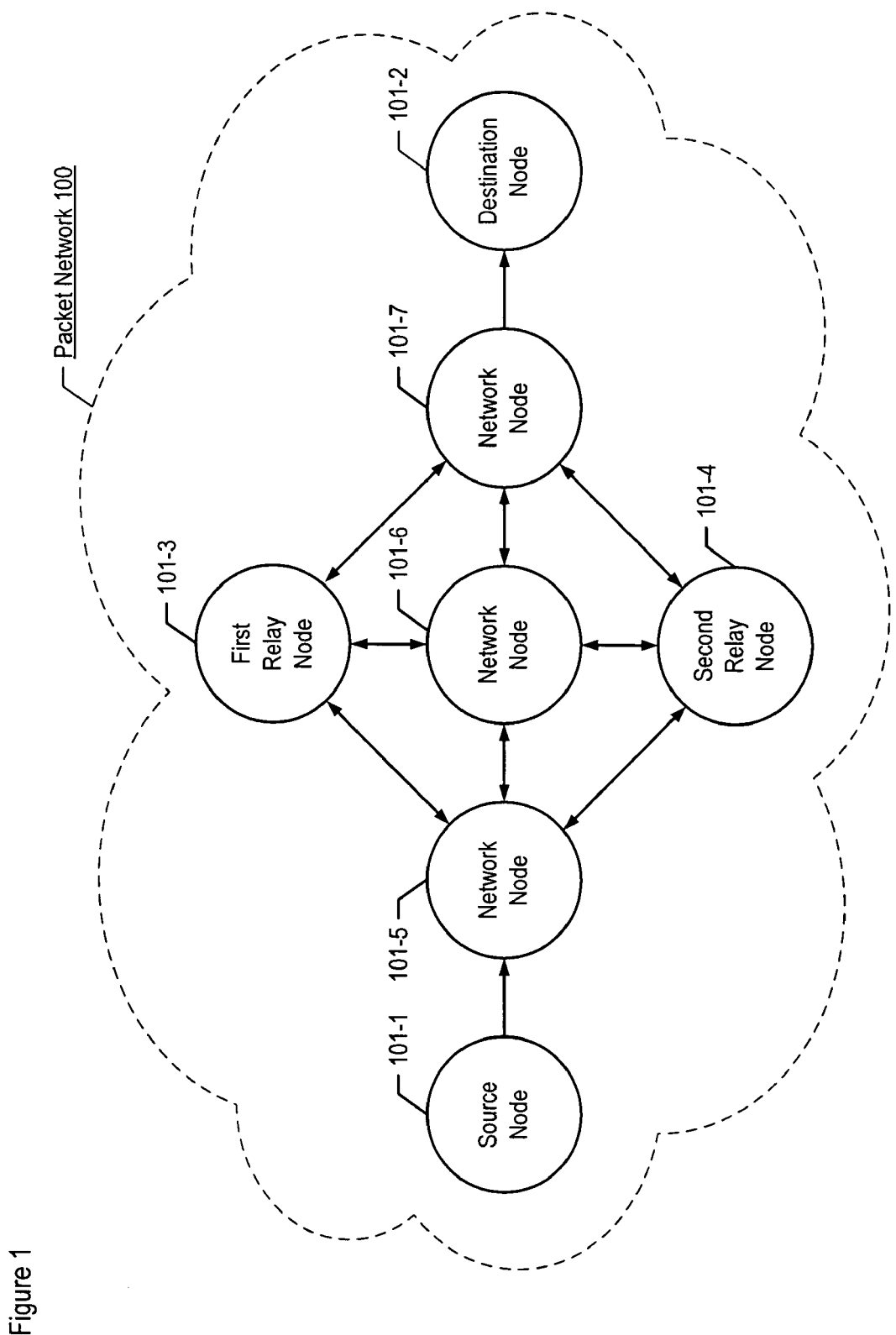
FIG. 1 depicts a schematic diagram of a packet network in accordance with the illustrative embodiment of the present invention.

FIG. 1 depicts a schematic diagram of a packet network in accordance with the illustrative embodiment of the present invention. In packet network 100, the quality of service of a stream of packets is attained by re-directing the stream off of one or more relay nodes between its source and destination. U.S. patent application Ser. No. 11/201,892, filed Aug. 11, 2005, entitled "Quality-of-Service Assurance for IP Telephony" is a tutorial on the use of relays nodes to attain quality of service goals for streams of packets.

Packet network 100 comprises: source node 101-1, destination node 101-2, first relay node 101-3, second relay node 101-4, and network nodes 101-5 through 101-7, interconnected as shown. Although the illustrative embodiment comprises seven nodes, it will be clear to those skilled in the art, after reading this specification, how to make and use alternative embodiments of the present invention that comprise any number of nodes.

Packet network 100 is capable of conveying a stream of packets that represents:
   i. audio, or
   ii. video, or
   iii. data, or
   iv. any combination of i, ii, and iii
between any two nodes. It is well known to those skilled in the art how to encode any combination of audio, video, and data into a stream of packets and how to decode the stream of packets to recover the original content.

In accordance with the illustrative embodiment, packet network 100 supports both connection-oriented sessions and connectionless (i.e., datagram) service between each pair of nodes.

Source node 101-1 comprises hardware and software and is capable of performing the functionality described below and in the accompanying drawings. Destination node 101-2 comprises hardware and software and is well known to those skilled in the art. First relay node 101-3 and second relay node 101-4 each comprise hardware and software and are well known to those skilled in the art. In accordance with the present invention, the salient characteristic of first relay node 101-3 and second relay node 101-4 is that each is capable of relaying or re-directing a packet addressed to it to another node. Switching nodes 101-5 through 101-6 each comprise hardware and software and are well known to those skilled in the art.

Figure 2:
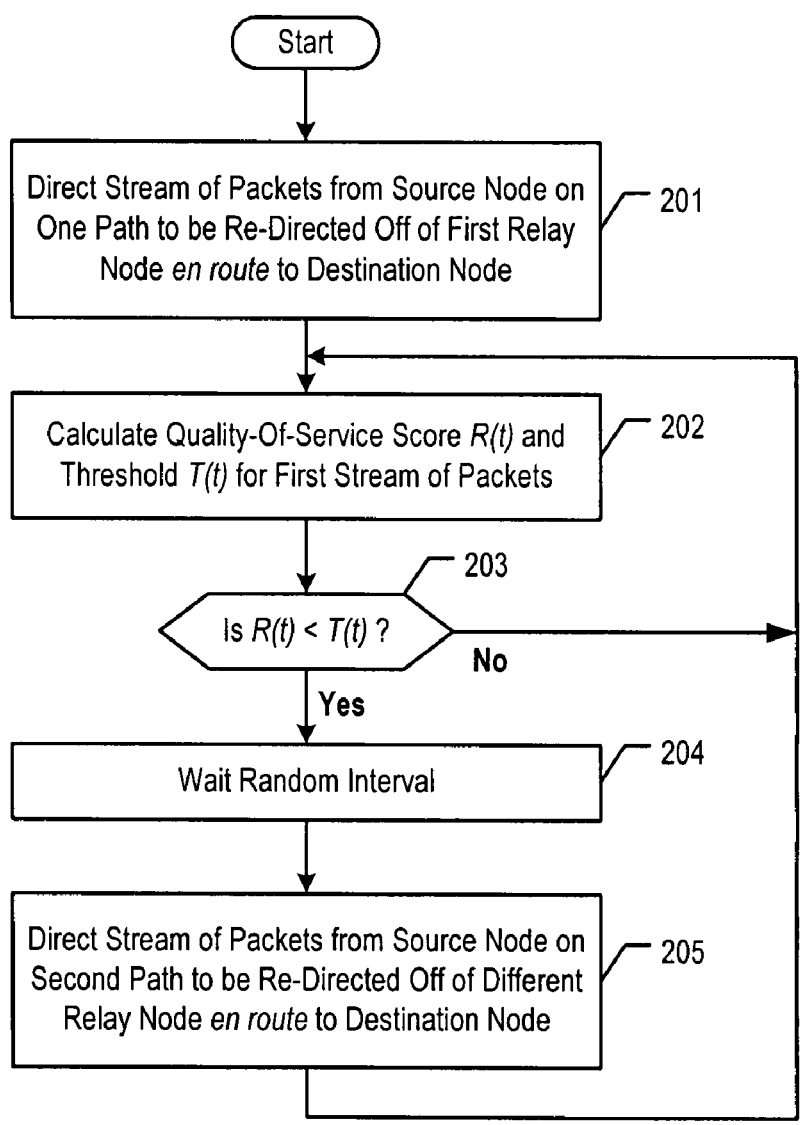
FIG. 2 depicts a flowchart of the operation of the illustrative embodiment of the present invention.

FIG. 2 depicts a flowchart of the operation of the illustrative embodiment of the present invention. Prior to the execution of task 201, there are one or more streams of packets flowing through packet network 100, and each of the streams originates at one of the nodes and terminates at another of the nodes.

At task 201, source node 101-1 directs a stream of packets to first relay node 101-3 on a first path with instructions that the stream is to be re-directed off of first relay node 101-3 en route to destination node 101-2. Task 201 occurs at moment $t_1$ and resets a probationary timer that is associated only with the stream of packets. It will be clear to those skilled in the art, after reading this specification, how to make embodiments of the present invention that perform task 201.

At task 202, source node 101-1 begins the function of (1) ensuring that the quality of service of the stream of packets as re-directed off of the first relay node remains acceptable, and (2) ensuring that the stream of packets as re-directed off of the first relay node does not destroy the quality of service of other streams of packets flowing in packet network 100. To do this, source node 101-1 calculates two quantities: (1) a quality-of-service score $R(t)$ for the stream of packets, and (2) a quality-of-service threshold $T(t)$ for the stream of packets. Because each of these quantities changes with time, both quantities are calculated to be effective for the same moment t to ensure that they can be compared on an apples-to-apples basis.

The calculation of the quality-of-service score $R(t)$ for the stream of packets can be accomplished in any of many well-known ways. In accordance with the illustrative embodiment, the quality-of-service score $R(t)$ for the stream of packets is given a score between 0 to 100 and is based on ITU-T Recommendation G.107, "The E Model: A computational model for use in transmission planning," 2003. It will be clear to those skilled in the art, however, how to make and use alternative embodiments of the present invention in which the quality-of-service score $R(t)$ is calculated in a different way.

Figure 3:
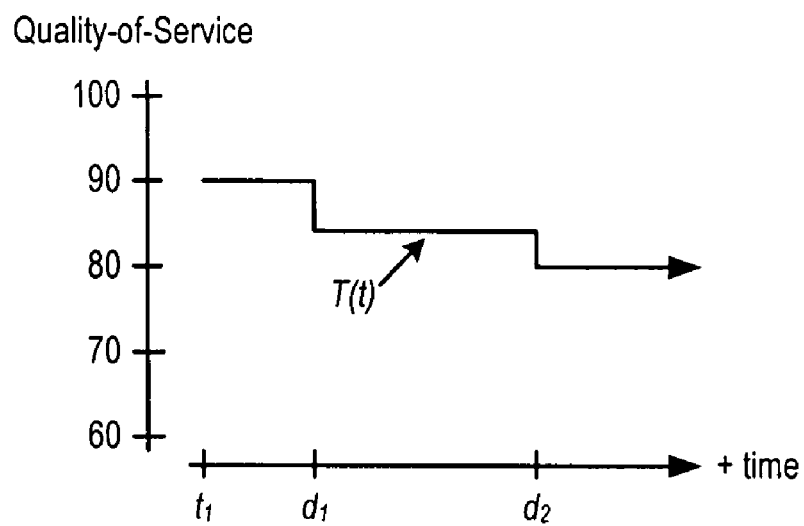
FIG. 3 depicts a graph of the threshold schedule in accordance with the illustrative embodiment of the present invention.

In accordance with the illustrative embodiment, the quality-of-service threshold $T(t)$ for the stream of packets decreases with time. In accordance with the illustrative embodiment, the threshold $T(t)$ decreases in discrete steps at moments $d_1$ and $d_2$. An example threshold schedule is depicted in Table 1 and FIG. 3.

TABLE 1

Example Threshold Schedule

| Probation Status | t | T |
|---|---|---|
| On Probation - | $t < d_1$ | 90 |
| Probationary Call | $d_1 \leq t \leq d_2$ | 85 |
| Off Probation - Established Call | $t > d_2$ | 80 |

The threshold schedule is a straightforward mechanism for initially putting the stream of packets on "probation" with respect to the other established streams of packets. In the event that the presence of the stream as relayed through relay node 101-3 is causing congestion and adversely affecting the quality of service of the other established streams of packets, the threshold schedule has the advantageous benefit of forcing the re-directing of the stream of packets before the quality of service of the other established streams of packets is irreparably affected. Although in accordance with the illustrative embodiment the threshold schedule comprises three discrete steps, it will be clear to those skilled in the art, after reading this disclosure, how to make and use alternative embodiments of the present invention in which the threshold decreases continuously or discretely in any number of steps.

Ideally, the probation interval is long enough that source node 101-1 can ascertain whether the quality of service of the other established streams of packets are adversely affected by the stream of packets and yet is short enough that source node 101-1 can re-direct the stream of packets before the quality of service of the other established streams of packets is irreparably affected.

At task 203, source node 101-1 compares the quality-of-service score $R(t)$ for the stream of packets, calculated in task 202, with the quality-of-service threshold $T(t)$ for the stream of packet, as also calculated in task 202. When the quality-of-service score $R(t)$ is greater than or equal to the quality-of-service threshold $T(t)$, then source node 101-1 infers that the quality of service for the stream of packets is good and control returns to task 202. In contrast, when the quality-of-service score $R(t)$ is less than the quality-of-service threshold $T(t)$, then source node 101-1 infers that the quality of service for the stream of packets is not good. In other words, that the stream of packets needs to be re-directed. In this case, control passes to task 204. A time-lapsed diagram comparing $R(t)$ and $T(t)$ is depicted in FIG. 4, which shows $R(t)$ falling below $T(t)$ at moment $t_2$.

At task 204, source node 101-1 waits a random interval of time before proceeding to task 205. This interval is depicted as between moment $t_2$ and moment $t_3$ in FIG. 4. The purpose of task 204 is to remediate the situation in which congestion in packet network 100 simultaneously causes many streams of packets to fall through their respective quality-of-service thresholds and many nodes try to simultaneously seek alternative paths for those streams. Put another way, the random interval is analogous to having soldiers break cadence when crossing a bridge. It will be clear to those skilled in the art how to make and use embodiments of the present invention that perform task 204.

Figure 4:
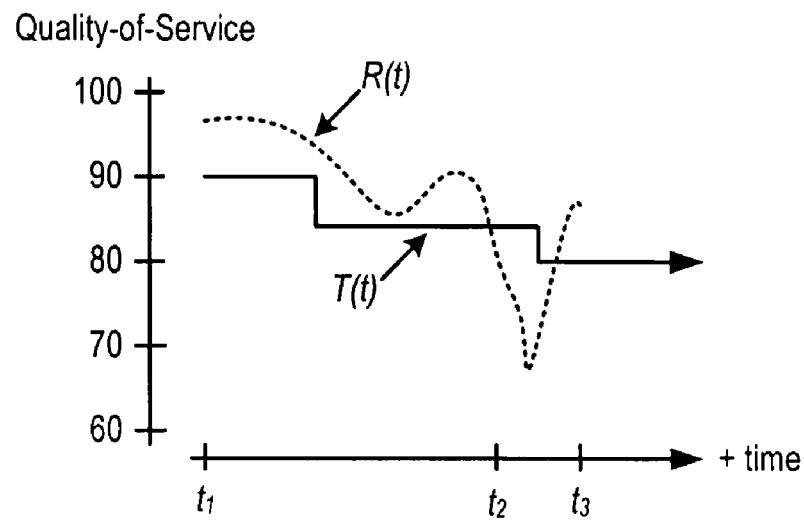
FIG. 4 depicts a graph of the quality-of-service score $R(t)$ for the stream of packets with respect to the threshold schedule in accordance with the illustrative embodiment of the present invention.

At task 205, at moment $t_3$ as depicted in FIG. 4, source node 101-1 seeks a second alternative path for the stream of packets and, as a consequence, re-directs the stream of packets to be re-directed off of second relay node 101-4 en route to destination node 101-2. As part of task 205, the probationary timer that is associated only with the stream of packets is reset and the probationary period begins again. It will be clear to those skilled in the art how to make and use embodiments of the present invention that perform task 205. From task 205, control returns to task 202.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   (1) at moment $t_1$, directing a stream of packets from a source node to a destination node on a first path;
   (2) at moment $t_2$, determining that a quality-of-service score $R(t)$ for the stream of packets is below a non-constant quality-of-service threshold $T(t)$, wherein the non-constant quality-of-service threshold $T(t)$ is a function of a length of a time period between the moment $t_1$ and the moment $t_2$, and wherein the non-constant quality-of-service threshold $T(t)$ varies and is greater at the moment $t_2$ than at a moment $t_2+\Delta$, $\Delta$ being a positive real number greater than zero; and
   (3) at moment $t_3$, based on the quality-of-service score $R(t)$ for the stream of packets on the first path being below the non-constant quality-of-service threshold $T(t)$, re-directing the stream of packets from the source node to the destination node on a second path, wherein the stream of packets is transmitted along the first path during an interval between the moment $t_2$ and the moment $t_3$, the moment $t_1$ being before the moment $t_2$ and the moment $t_2$ being before the moment $t_3$.

2. The method of claim 1 wherein directing the stream of packets from the source node to the destination node on the first path comprises transmitting the stream of packets from the source node to be re-directed off of a first relay node en route to the destination node, and wherein re-directing the stream of packets from the source node to the destination node on the second path comprises transmitting the stream of packets from the source node to be re-directed off of a second relay node en route to the destination node.

3. The method of claim 1 wherein the quality-of-service threshold T(t) is greater at the moment $t_1$ than at the moment $t_2$.

4. The method of claim 1 wherein the interval between the moment $t_2$ and the moment $t_3$ is randomly chosen from a range of back-off intervals.

5. A system comprising:
   a processor;
   a computer-readable medium storing instructions which, when executed by the processor, cause the processor to perform a method comprising:
   (1) at moment $t_1$, directing a stream of packets from a source node to a destination node on a first path;
   (2) at moment $t_2$, determining that a quality-of-service score R(t) for the stream of packets is below a non-constant quality-of-service threshold T(t), wherein the non-constant quality-of-service threshold T(t) is a function of a length of a time period between the moment $t_1$ and the moment $t_2$, and wherein the non-constant quality-of-service threshold T(t) varies and is greater at the moment $t_2$ than at a moment $t_2+\Delta$, $\Delta$ being a positive real number greater than zero; and
   (3) at moment $t_3$, based on the quality-of-service score R(t) for the stream of packets on the first path being below the non-constant quality-of-service threshold T(t), re-directing the stream of packets from the source node to the destination node on a second path, wherein the stream of packets is transmitted along the first path during an interval between the moment $t_2$ and the moment $t_3$, and wherein the moment $t_1$ is before the moment $t_2$ and the moment $t_2$ is before the moment $t_3$.

6. A non-transitory computer-readable storage medium having stored therein instructions which, when executed by a processor, cause the processor to perform a method comprising:
   (1) at moment $t_1$, directing a stream of packets from a source node to a destination node on a first path;
   (2) at moment $t_2$, determining that a quality-of-service score R(t) for the stream of packets is below a non-constant quality-of-service threshold T(t), wherein the non-constant quality-of-service threshold T(t) is a function of a length of a time period between the moment $t_1$ and the moment $t_2$, and wherein the non-constant quality-of-service threshold T(t) varies and is greater at the moment $t_2$ than at a moment $t_2+\Delta$, $\Delta$ being a positive real number greater than zero; and
   (3) at moment $t_3$, based on the quality-of-service score R(t) for the stream of packets on the first path being below the non-constant quality-of-service threshold T(t), re-directing the stream of packets from the source node to the destination node on a second path, wherein the stream of packets is transmitted along the first path during an interval between the moment $t_2$ and the moment $t_3$, and wherein the moment $t_1$ is before the moment $t_2$ and the moment $t_2$ is before the moment $t_3$.

* * * * *